Mar. 6, 1923.

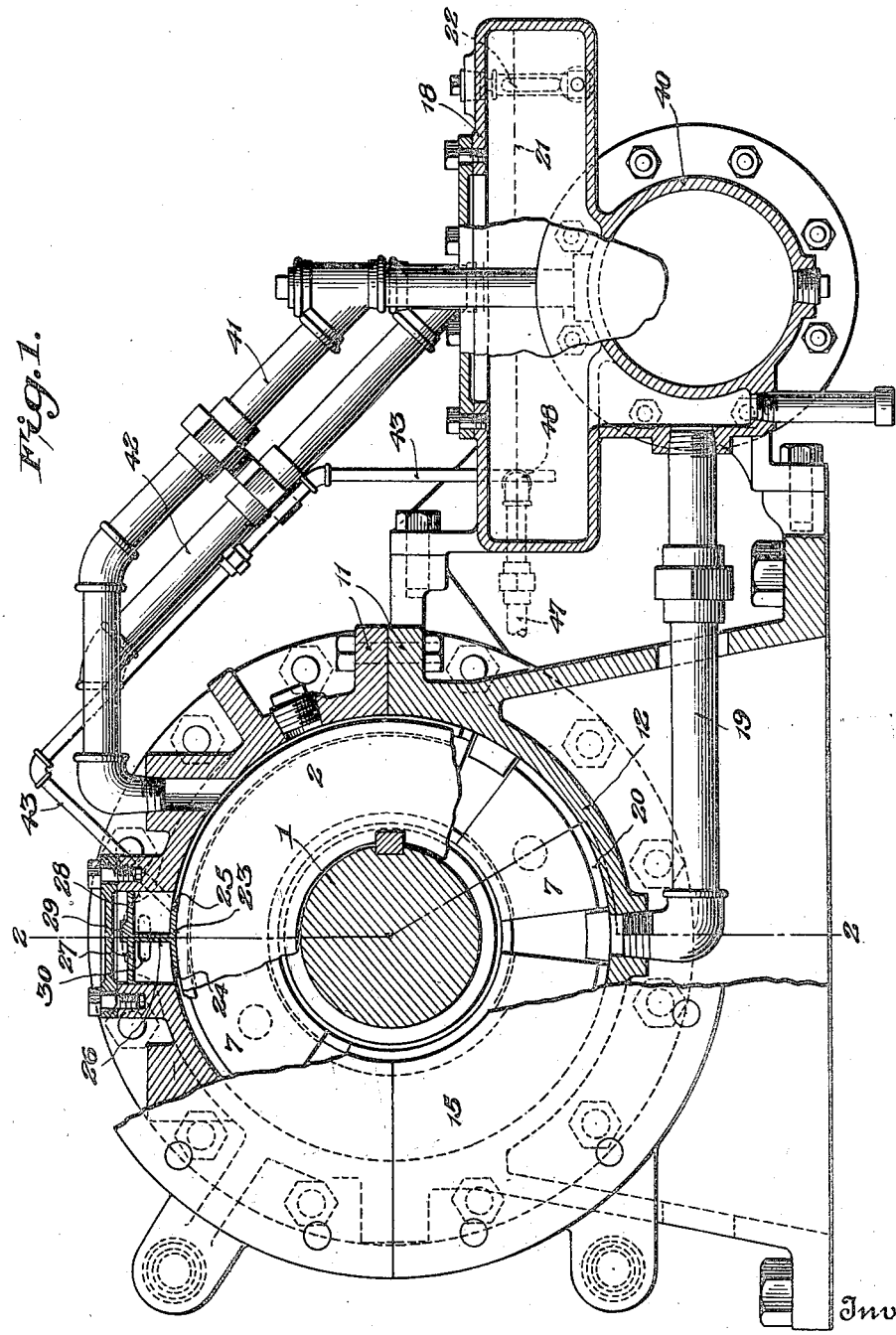

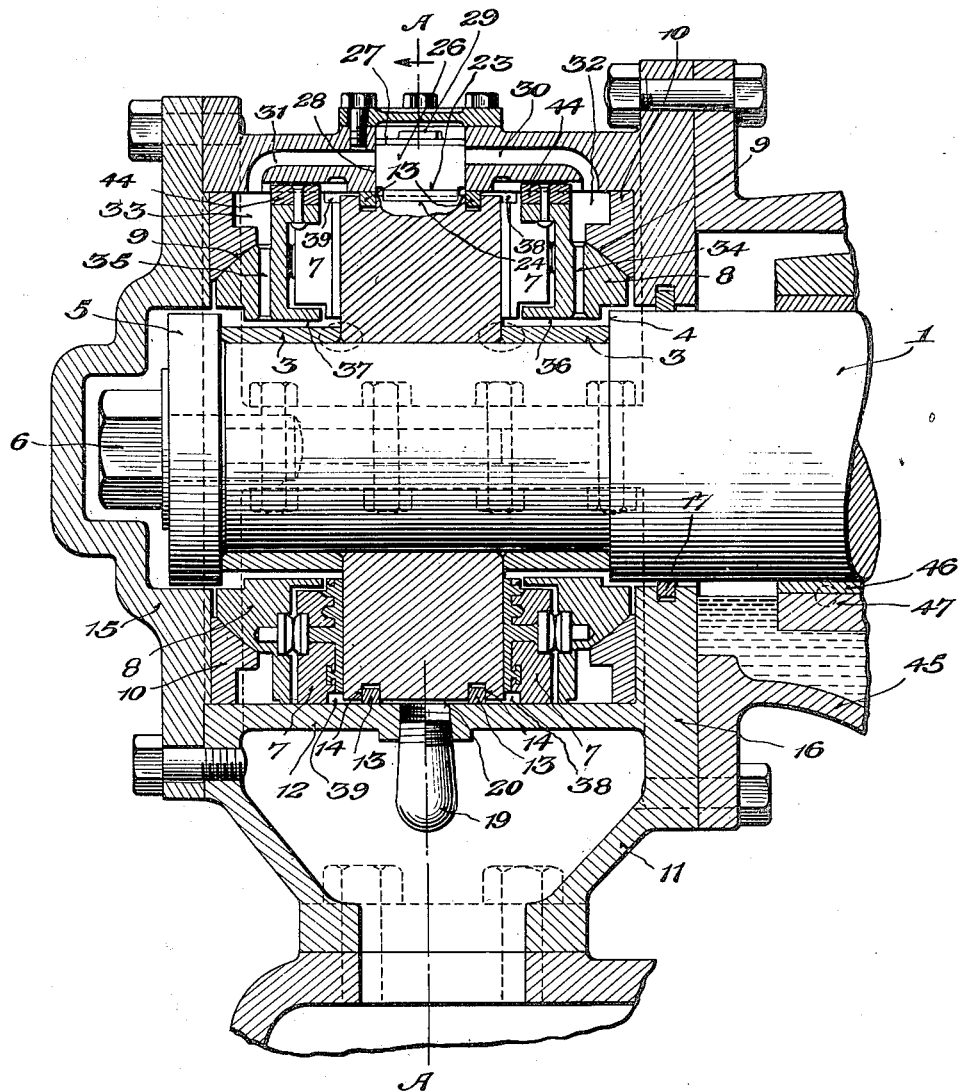

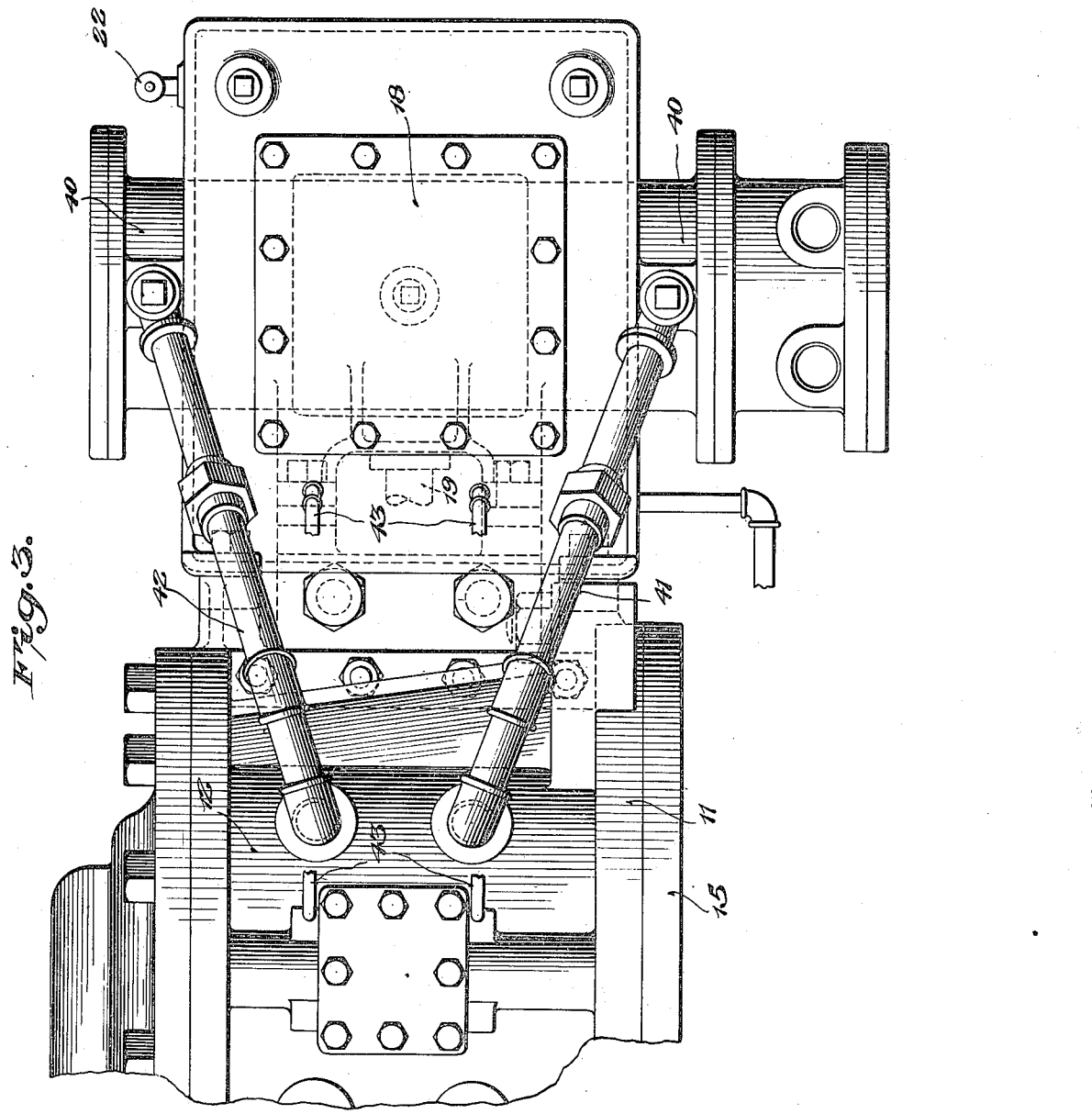

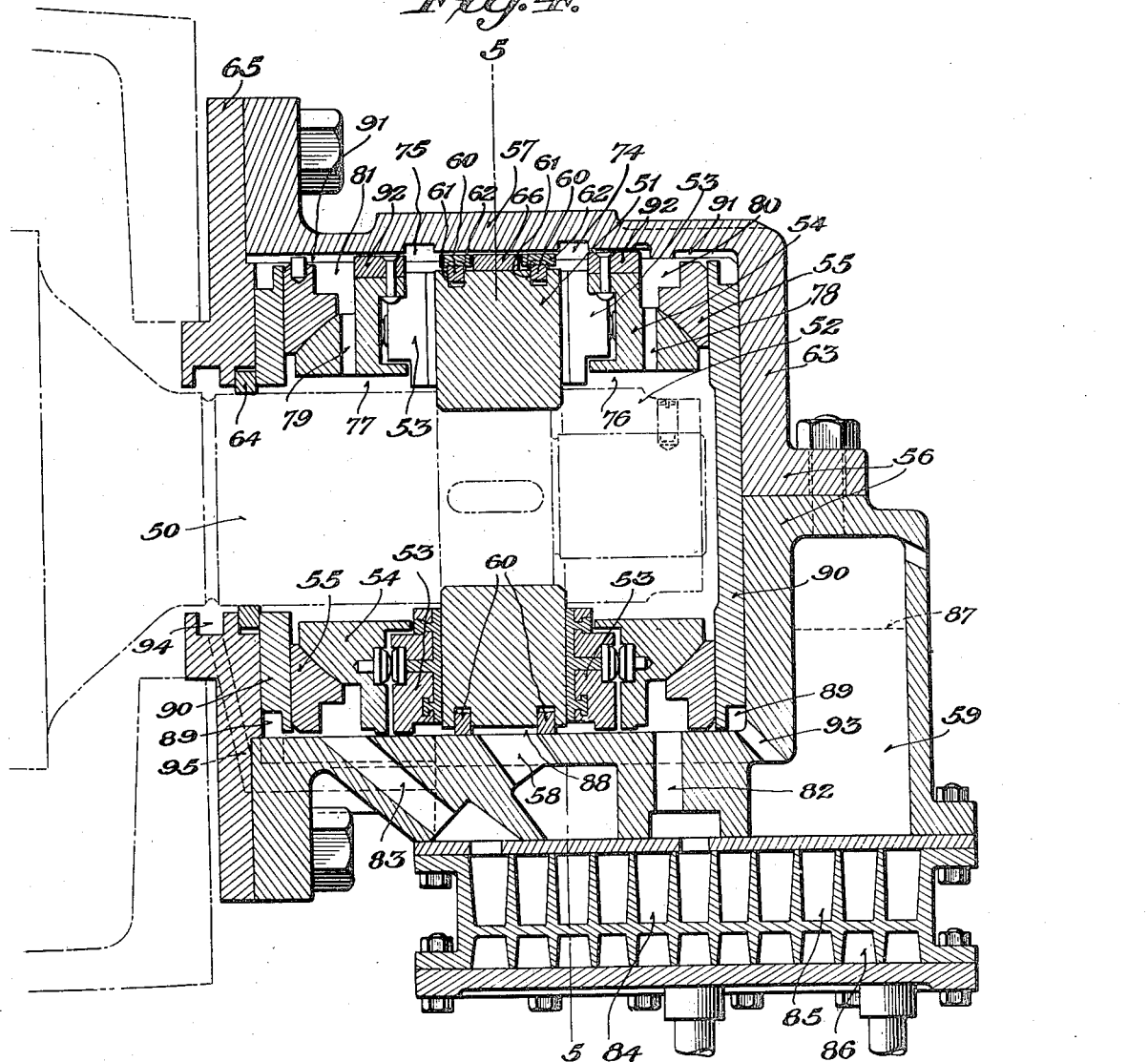

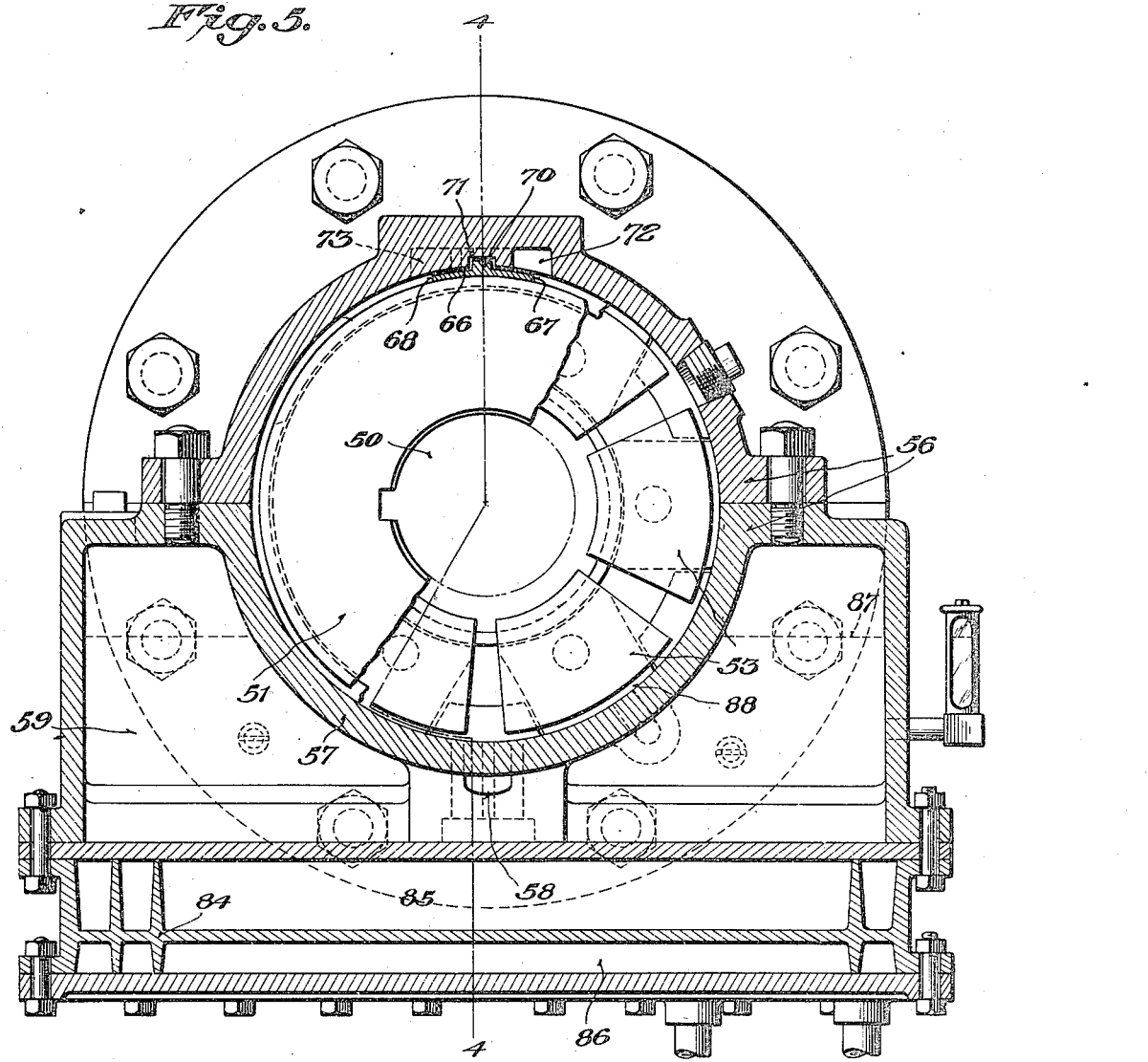
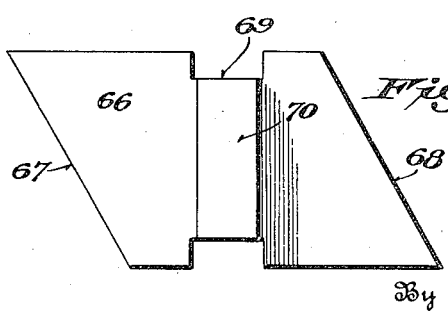

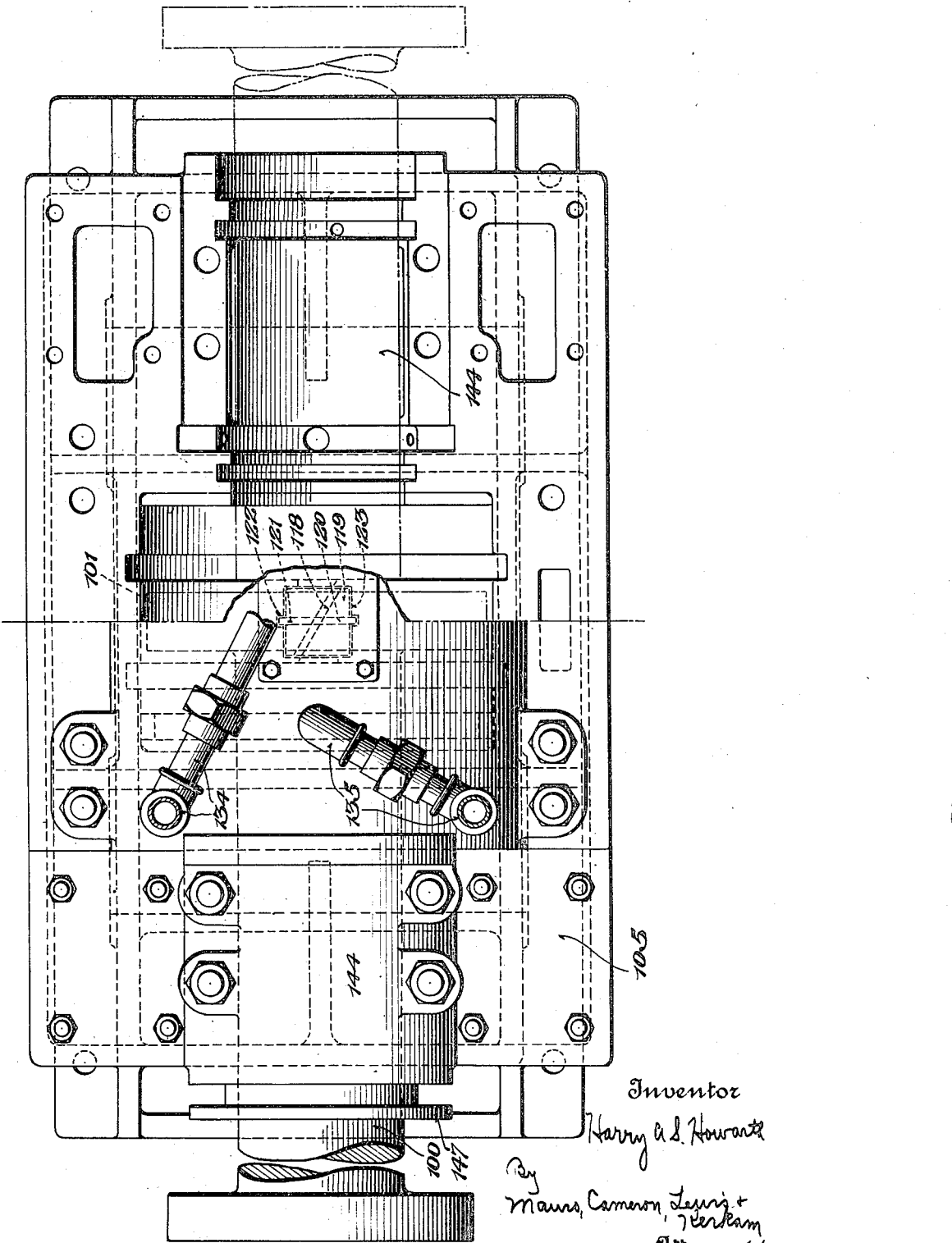

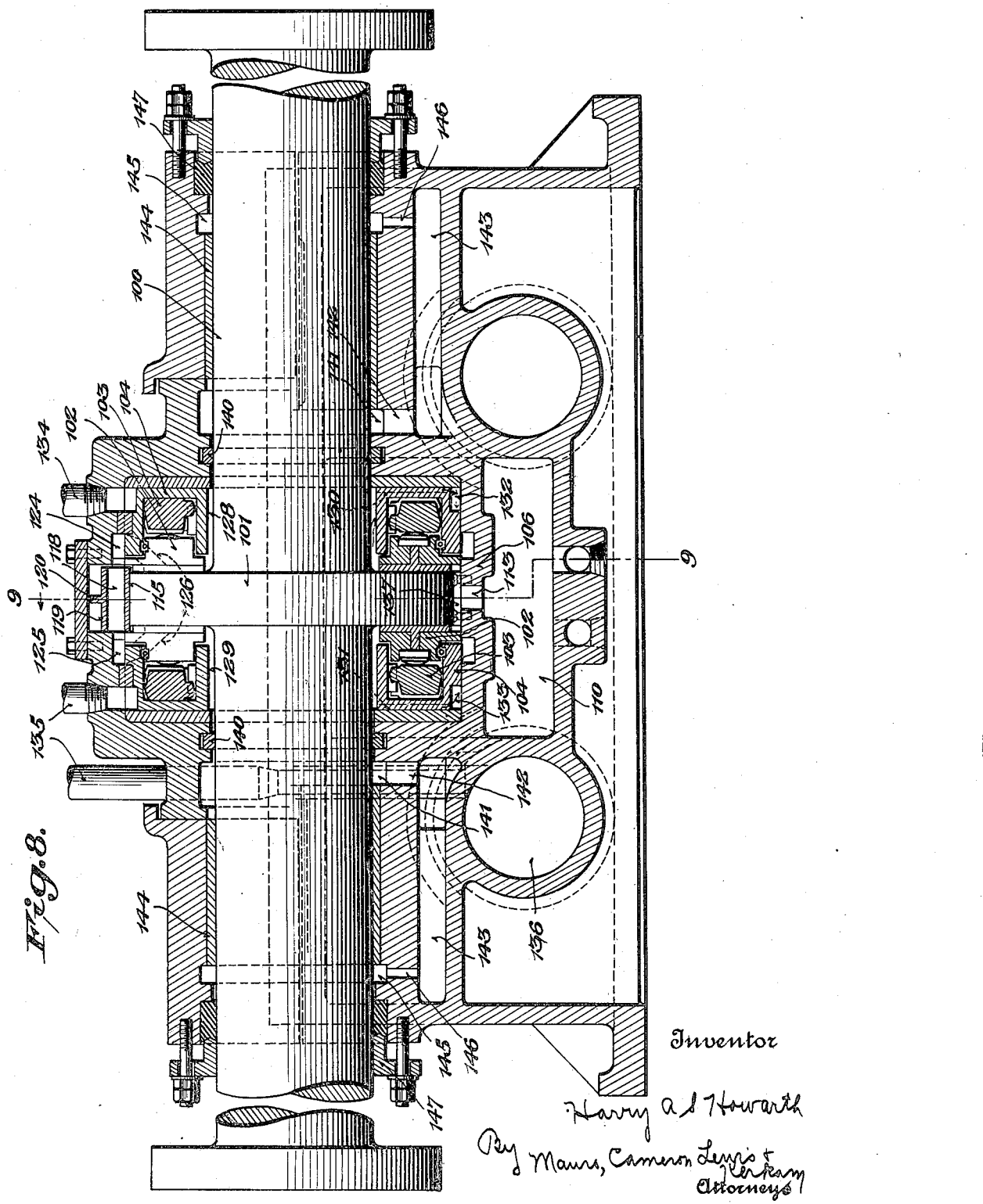

H. A. S. HOWARTH

HORIZONTAL THRUST BEARING

Filed Nov. 6, 1920 11 sheets-sheet 8

1,447,665

Inventor
Harry A. S. Howarth
By Mauro Cameron, Lewis & Kerkam
Attorneys

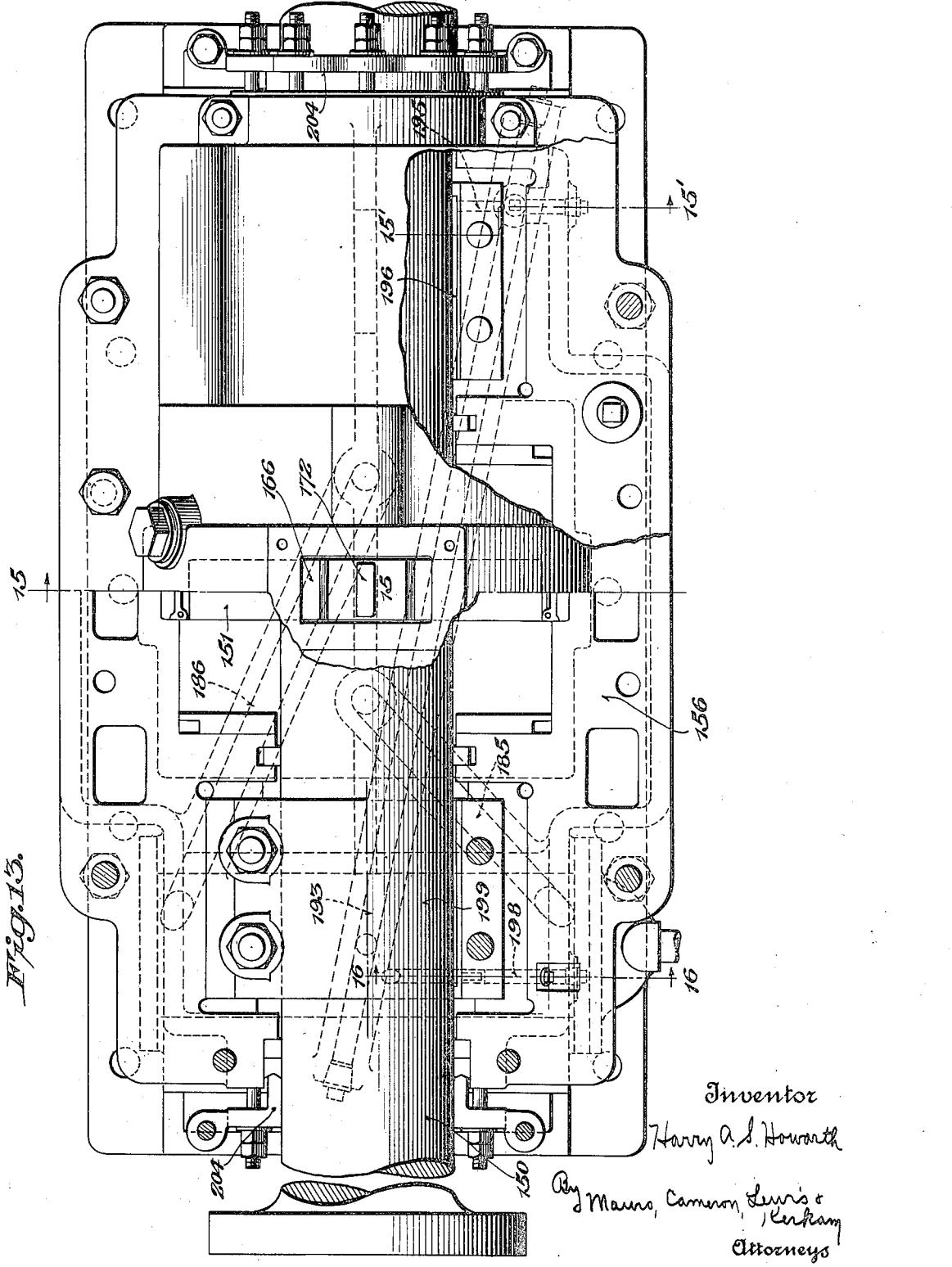

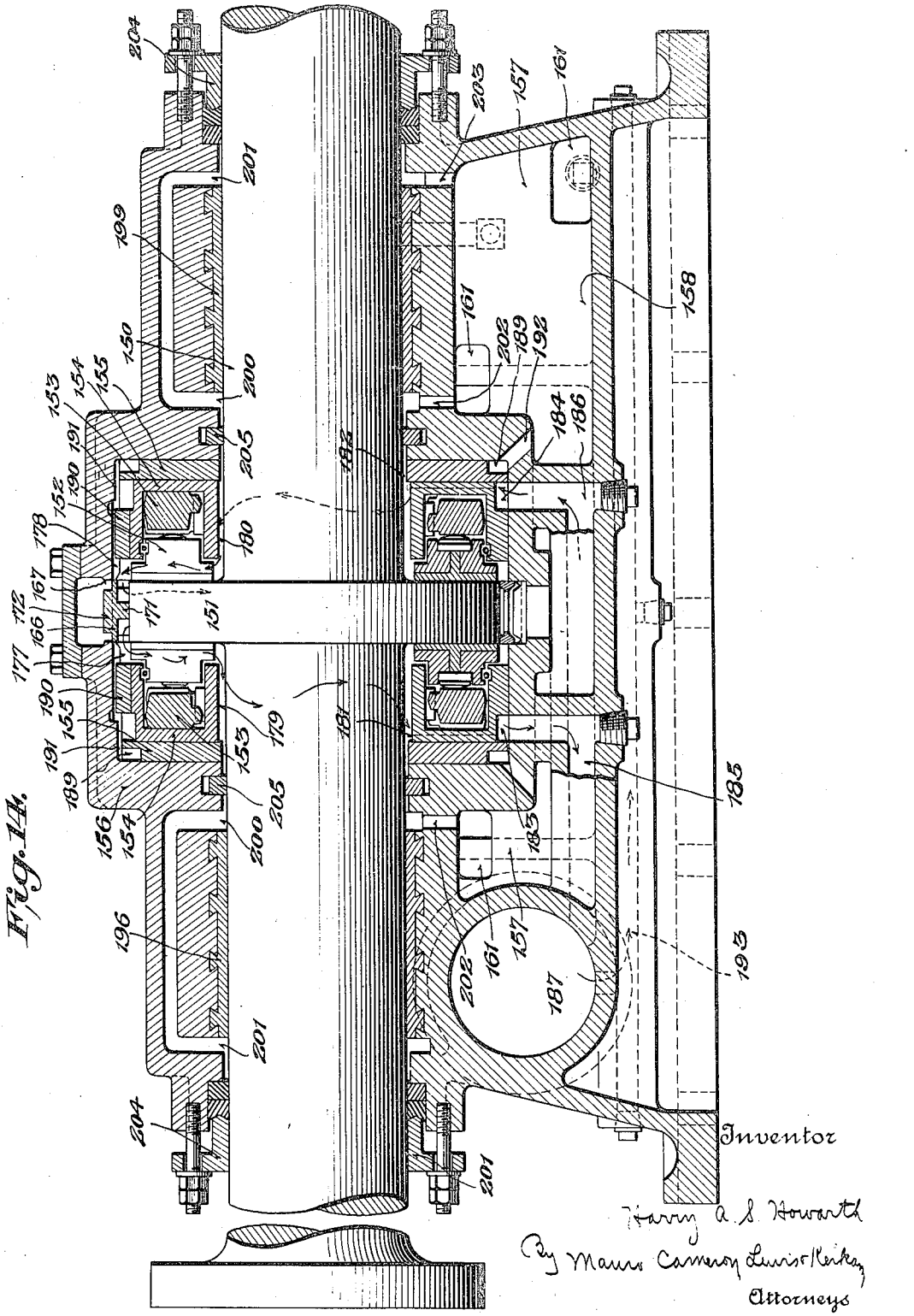

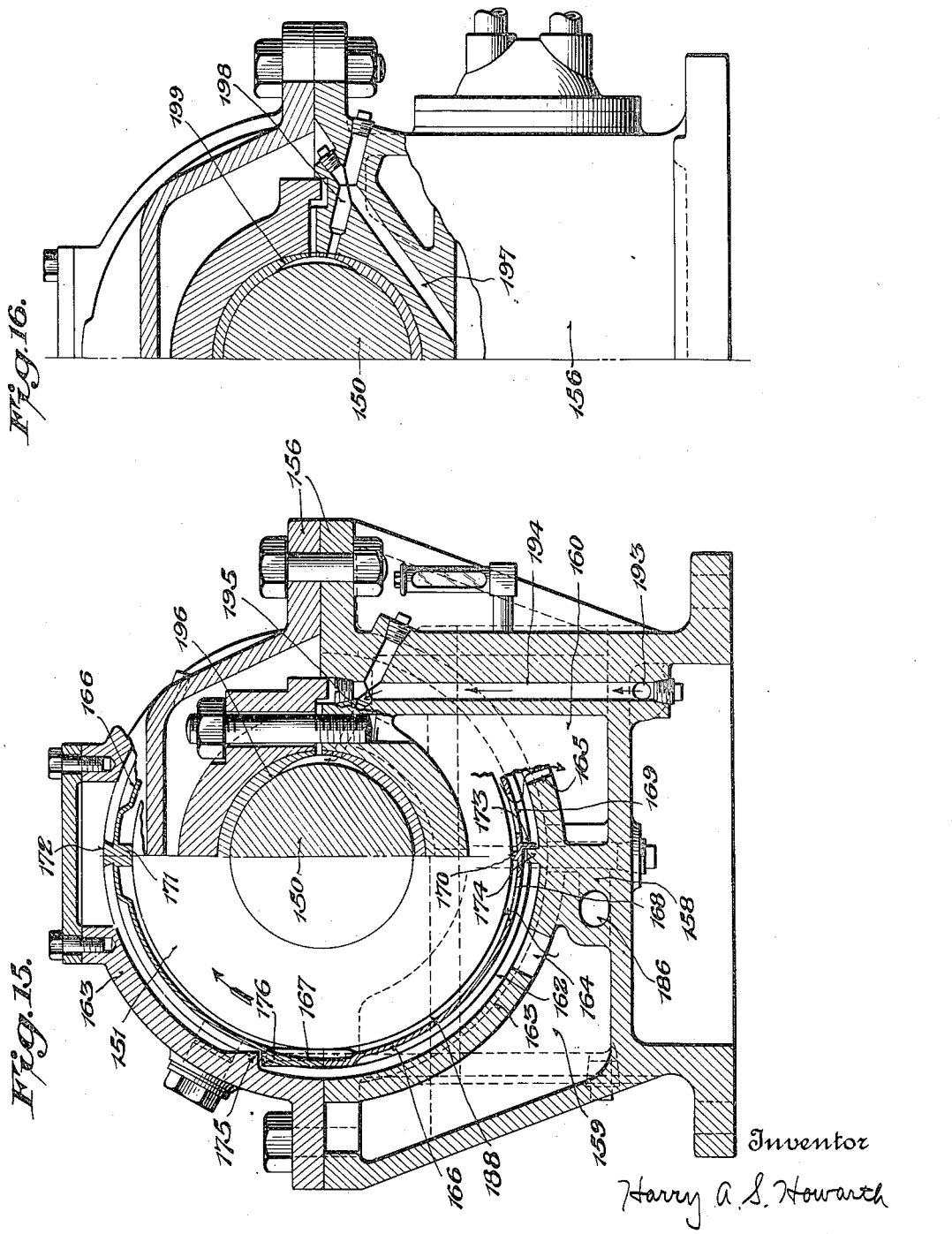

Patented Mar. 6, 1923.

1,447,665

UNITED STATES PATENT OFFICE.

HARRY A. S. HOWARTH, OF PITTSBURGH, PENNSYLVANIA, ASSIGNOR TO ALBERT KINGSBURY, OF PHILADELPHIA, PENNSYLVANIA.

HORIZONTAL THRUST BEARING.

Application filed November 6, 1920. Serial No. 422,369.

*To all whom it may concern:*

Be it known that I, HARRY A. S. HOWARTH, a citizen of the United States, and a resident of Pittsburgh, Pa., have invented new and useful Improvements in Horizontal Thrust Bearings, which invention is fully set forth in the following specification.

This invention relates to thrust bearings for horizontal or inclined shafts and, more particularly, to means for maintaining a flow of lubricating oil through the bearing and also, preferably, through means for extracting heat from said oil.

It has heretofore been proposed in the application of Albert Kingsbury Serial No. 416,186, filed October 11, 1920, to provide a thrust bearing for horizontal or inclined shafts with one or more oil-retaining chambers in which the bearing members are disposed and to maintain said bearing members immersed in oil when the bearing is in operation by keeping said chamber or chambers full of oil that is directed into said chamber or chambers by oil-collecting means cooperating with a rotatable oil-carrying surface, said oil-collecting means being so related to said chamber or chambers that a pressure is maintained on the oil therein whereby a more rapid circulation of oil can be obtained and the pressure utilized to secure a circulation of the oil through an oil-cooling device, one or more guide bearings, or both. In order that a pressure may be maintained on the oil in said chamber or chambers, the inlet thereto must communicate only with the oil-collecting side of said oil-collecting means; therefore the oil-circulating system heretofore proposed by said Albert Kingsbury is unavailable for use with bearings which may be, or are intended to be, rotated in both directions, because the oil-retaining chamber or chambers are not in communication with the rear of the oil-collecting means and, accordingly, if the direction of rotation of the shaft be reversed said oil-collecting means will not function to direct oil into said oil-retaining chambers.

It is an object of this invention to provide a thrust bearing for horizontal or inclined shafts, having oil-retaining chambers in which the bearing members are disposed, with oil-collecting means so related to said chambers that the latter may be kept full of oil when the bearing is in operation and the oil maintained under a pressure to secure the desired circulation thereof in whichever direction the shaft may rotate.

Another object of this invention is to provide a thrust bearing for horizontal or inclined shafts with a plurality of oil-retaining chambers, means for collecting oil from a rotatable oil-carrying surface and directing it into one of said oil-retaining chambers and so related thereto that a pressure is maintained on the oil in said chamber, and connections whereby the oil will circulate from said first chamber to and through the other oil-retaining chambers.

Another object of this invention is to provide a thrust bearing for horizontal or inclined shafts with a plurality of oil-retaining chambers, means for collecting oil from a rotatable oil-carrying surface and directing it into one or another of said oil-retaining chambers as said oil-carrying surface rotates in one direction or the other, said oil-collecting means being so related to said chambers that a pressure is maintained on the oil in the chamber into which it is first directed, and connections between said oil-retaining chambers whereby the oil will circulate through all of said chambers, in whichever direction said oil-carrying surface is rotated.

Another object of this invention is to provide a thrust bearing for horizontal or inclined shafts, having an oil-circulation as characterized, with an oil-cooling device interposed in the connections between the oil-retaining chambers whereby heat is extracted from the oil as it flows from one chamber to another.

Another object of this invention is to provide a thrust bearing for horizontal or inclined shafts, having an oil-circulation as characterized, with means whereby one or more guide bearings may be supplied with lubricant from the circulating oil by the pressure to which the latter is subjected.

Another object of this invention is to provide a thrust bearing for horizontal or inclined shafts, having a plurality of oil-retaining chambers and an oil-cooling device, with connections whereby said oil is circulated through said chambers in succession and through said oil-cooling device as it flows from one of said chambers to another.

Another object of this invention is to provide a thrust bearing for horizontal or inclined shafts with oil-circulating means which is simple in construction and efficient in operation, which enables a compact and simple oil-cooling device to be employed exteriorly of the oil reservoir without the use of an oil-circulating pump, and which is available for use with either or both directions of shaft rotation.

Another object of this invention is to provide improved oil-collecting means suitable for collecting and deflecting oil from the peripheral surface of a rotatable thrust collar. Other objects will appear as the description of the invention proceeds.

State broadly, the invention comprises a thrust bearing for horizontal or inclined shafts having relatively rotatable bearing members, a plurality of oil-retaining chambers in which said bearing members are disposed, a rotatable oil-carrying surface, means for collecting oil from said oil-carrying surface and directing it into one of said oil-retaining chambers, said oil-collecting means being so related to said chamber that a pressure is maintained on the oil therein, and connections whereby the oil is circulated from said first chamber to and through the other oil-retaining chambers under the pressure to which it is subjected in said first chamber. Preferably, said oil-collecting means and chambers are so related that the oil is directed into one or another of said chambers as the oil-carrying surface rotates in one direction or the other, and the circulation is maintained through said chambers in whichever direction said oil-carrying surface may rotate. The pressure maintained on the oil may be utilized to cause a flow of the oil to an oil-cooling device, or to one or more guide bearings, or to both, and when an oil-cooling device is employed it is preferably interposed in the connections between the oil-retaining chambers. The invention also embraces the circulation of oil through a plurality of oil-retaining chambers in succession and through an oil-cooling device interposed in the connections between said chambers, as well as other novel features of construction to be hereinafter pointed out.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring in detail to said drawings, wherein the same reference characters are employed to designate corresponding parts in the several figures:—

Fig. 1 is an end elevation, partly in transverse section, of a thrust bearing embodying the present invention;

Fig. 2 is an axial section on the line 2—2 of Fig. 1;

Fig. 3 is a partial plan view of the bearing housing of the embodiment shown in Fig. 1;

Fig. 4 is an axial section of another thrust bearing embodying the present invention;

Fig. 5 is a transverse section on the line 5—5 of Fig. 4;

Fig. 6 is a detail of the oil collector employed in the embodiment of Figs. 4 and 5;

Fig. 7 is a plan of another thrust bearing embodying the present invention, the upper half of the housing being removed in the right hand half of the figure;

Fig. 8 is an axial section of the bearing shown in Fig. 7;

Fig. 13 is a plan, partly broken away, of another thrust bearing embodying the present invention, the upper half of the housing being removed in the left hand half of the figure and the bearing segments or shoes being omitted for the sake of clearness;

Fig. 14 is an axial section of the bearing shown in Fig. 13;

Figure 9:
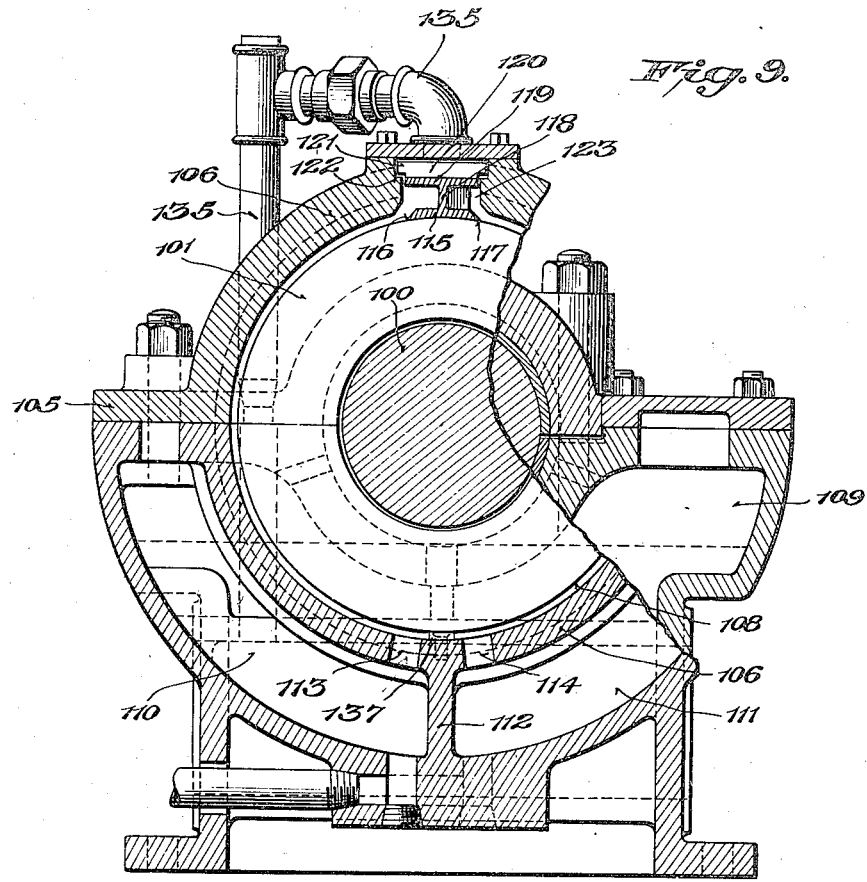
Fig. 9 is a transverse section, partly broken away, on the line 9—9 of Fig. 8.

Fig. 15 is a transverse section on the line 15—15 of Fig. 13 at its left hand portion and a transverse section on the line 15'—15' of Fig. 13 at its right hand portion; and Fig. 16 is a half transverse section on the line 16—16 of Fig. 13.

In the form shown in Figs. 1, 2 and 3, 1 is a horizontal shaft on which is mounted in any suitable way a thrust collar 2 of any suitable construction. Said thrust collar may be positioned on the shaft 1 in any suitable way, as by mounting the same on a portion of the shaft having a reduced diameter with a sleeve 3 interposed between said collar and the shoulder 4 provided by said reduction in diameter, and a similar sleeve 3 is interposed between said collar and a collar 5 retained on a threaded extension of said shaft by a nut 6. Cooperating with the opposed faces of said thrust collar 2 are bearing members of any suitable construction. In the form shown, said bearing members are composed of a plurality of bearing segments or shoes 7 mounted to tilt, preferably both radially and circumferentially of the bearing, in any suitable way on equalizing means of any suitable construction, shown as an equalizing ring 8 provided with a spherical surface 9 for engagement with the opposed spherical surface of a base ring 10. It is to be expressly understood, however, that any other suitable construction and arrangement of thrust bearing members and equalizing means may be employed, if desired.

Surrounding the thrust bearing thus provided is a housing 11 of any suitable construction and including a generally cylindrical wall 12 which closely embraces the periphery of the thrust collar 2 and extends on either side thereof to provide chambers in which the bearing members are disposed. In order that said chambers may be maintained full of oil when the bearing is in operation, means are provided between the thrust collar and the housing for retaining oil in said chambers. Oil-retaining means of any suitable construction may be employed, that shown in the embodiment of Figs. 1 to 3 comprising a pair of contact rings 13 mounted in annular grooves 14 in the periphery of the thrust collar and adapted to contact the inner surface of the generally cylindrical wall 12. Thereby is provided on each side of the collar 2 an oil-retaining chamber in which the oil may collect and in which the bearing members are disposed. The left-hand oil-retaining chamber, in the form shown, is completed by the removal cover 15 of the bearing housing, while the right-hand oil-retaining chamber is completed by the housing wall 16 and a contact ring 17 interposed between said wall and the shaft 1.

An oil reservoir is provided for supplying oil to the peripheral surface of the thrust collar 2. In the form shown in Figs. 1 to 3, the oil reservoir is provided in a separate casing or compartment 18 suitably attached to the bearing housing 11 and communicating through a pipe 19 with the space 20 between the generally cylindrical wall 12 and the periphery of the thrust collar on the one hand and between said contact rings 13 on the other hand. The oil is maintained at such a level in the reservoir 18, as indicated by the dotted line 21, that the oil flows into the space 20 and wets the lower portion of the thrust collar 2, the level of the oil preferably being below that of the underside of the shaft. An oil gauge 22 may be provided to indicate the height of the oil in said reservoir. The thrust collar 2 therefore dips into the oil in the space 20 and the peripheral surface of the collar constitutes an oil-carrying surface by which oil is carried upwardly to the top of the bearing housing.

Means are provided for collecting oil from said rotatable oil-carrying surface and directing it into the oil-retaining chambers in which the bearing members are disposed. Said oil-collecting means may be of any suitable construction and may be mounted on either the thrust collar or on the housing, but is so related to said chambers that, for a given direction of shaft rotation, it directs oil into but one of said chambers. In the form shown in Figs. 1 to 3, the oil collector comprises an arcuate bottom portion 23 adapted to ride on the periphery of the thrust collar and provided with transverse oil-collecting edges 24 and 25 at its two extremities; a generally vertical oil-directing partition 26 which extends diagonally across the bottom portion 23; and an upper substantially horizontal portion 27 which is designed to fit closely within the machined recess 28 provided in the top of the housing. If desired, said upper portion 27 may also be provided with an upwardly-extending lug 29 to facilitate insertion and withdrawal of the oil collector. The lower portion 23 preferably extends across the peripheral surface of the thrust collar substantially the full width between the contact rings 13, but a slight clearance may be left as shown in Fig. 2 to provide for wear and play and to insure that the oil collector shall not become jammed against either of the contact rings 13.

Communicating with the recess 28 in which the oil collector is positioned are oil passages 30 and 31 leading to the oil-retaining chambers. These passages may be formed in any suitable way, being shown as cored passages in the wall of the housing. Owing to the diagonal position of the upright wall 26 of the oil collector, it will be perceived that one of said passages communicates only with the space at one side of said partition 27 and the other of said passages communicates only with the space at the opposite side of said partition 26. Said passages 30 and 31 may communicate at their opposite ends with the spaces between the bearing segments or shoes for circulation of the oil downwardly and then to the rear thereof, or they may communicate with the spaces to the rear of the bearing segments or shoes for circulation of the oil downwardly and then inwardly to the spaces between said segments or shoes. In the form shown in Figs. 1 to 3, annular chambers 32 and 33 are provided at the rear of the equalizing rings 8 and between said rings and the base rings 10, with which annular chambers the oil passages 30 and 31 respectively communicate. Said annular chambers 32 and 33 in turn respectively communicate through radial passages 34 and 35 in the equalizing rings 8 with axial passages 36 and 37 between said rings and the sleeves 3, which passages in turn communicate respectively with the radial spaces between the bearing segments or shoes on either side of said thrust collar. Said last-named radial spaces are in communication respectively with annular chambers 38 and 39 at the forward sides of the equalizing rings 8, and said annular chambers 38 and 39 are in turn in communication through connections of any suitable construction. Preferably said last-named connections include an oil-cooling device and, in the form shown in Figs. 1 to 3, an oil-cooling device 40, which may be of any suitable construction, is in communication at its opposite ends through pipes 41 and 42 with said annular chambers 38 and 39 respectively.

In operation, oil flows from the reservoir 18 through the pipe 19 into the annular space 20 and wets the periphery of the thrust collar 2. Said peripheral surface thereby constitutes a rotatable oil-carrying surface which dips into the oil in the annular space 20 and carries it up to the oil-collecting means. Assuming that the shaft is rotating in a clockwise direction as viewed in Fig. 1, the oil is collected from said oil-carrying surface by the edge 24 and deflected by the diagonal partition 26 into the oil passage 30. From the latter it flows into the annular chamber 32 and then through the radial passages 34 and axial passage 36 into the radial spaces between the bearing segments or shoes 7, where it lubricates the bearing surfaces of said segments and the thrust collar in the oil-retaining chamber at the right hand side of said collar. As the inlet 30 of said oil-retaining chamber is in communication only with the space at the oil-collecting side of said oil-collecting means, the pumping action of the rotatable oil-carrying surface builds up and maintains a pressure on the oil in said oil-retaining chamber at the right-hand side of the thrust collar, because the oil adhering to the periphery of the collar is backed up by the oil-collecting means until it fills the annular space, at the forward side of said oil-collecting means, between the periphery of said collar and the inner face of the circumjacent housing, and thereafter the action of the rotating collar on said peripheral body of oil, tending to rotate the same in the direction in which said collar rotates, creates a pressure in said peripheral body of oil, which pressure is transmitted to the oil entering the chamber in which the bearing members are disposed. This pressure causes the oil to flow radially upward through the spaces between the bearing segments or shoes 7 into the annular chamber 38 and then through the pipe 41 to one end of the oil-cooling device 40. The oil then circulates through said oil-cooling device and flows through the pipe 42 to the annular chamber 39 at the opposite side of the thrust collar, whence it flows inwardly through the radial spaces between the left-hand bearing segments or shoes 7, then outwardly through the axial passage 37 and radial passages 35 into the annular chamber 33. From the latter chamber the oil flows through the passage 31 to the opposite side of the partition 26 and then downwardly around the opposite side of the thrust collar, where it may be returned to the oil reservoir or, as in the form shown, again be carried upwardly by the thrust collar to be again collected and deflected by the oil-collecting means.

If the direction of the rotation of the shaft be reversed, so that the shaft is rotating in an anti-clockwise direction as viewed in Fig. 1, the oil is collected by the edge 25 and deflected by the diagonal partition 26 into the oil passage 31, whence it flows through the annular chamber 33 and the passages 35 and 37 to fill the oil-retaining chamber at the left-hand side of the thrust collar. As the inlet 31 of said chamber communicates only with the oil-collecting side of the oil-collecting means, the pumping action of the oil-carrying surface builds up and maintains a pressure on the oil in said chamber and, therefore, the oil flows radially outwardly through the spaces between the left-hand bearing segments or shoes 7 through the annular chamber 39 and pipe 42 into the oil-cooling device 40. After circulating through the latter, the oil flows through the pipe 41 to the annular chamber 38 at the right-hand side of the thrust collar, and then radially inwardly through the spaces between the bearing segments or shoes and through the passages 36 and 34 to the annular chamber 32, from which it flows through the passage 30 to the opposite side of the diagonal partition 26 and then returns around the opposite side of the thrust collar.

It will therefore be perceived that an oil-circulating system has been provided whereby the pumping action of the rotatable oil-carrying surface may be utilized to develop and maintain a pressure on the oil in an oil-retaining chamber and said pressure utilized to circulate said oil through another oil-retaining chamber and also, preferably, through an oil-cooling device. Moreover, this oil-circulating system is equally effective for either direction of shaft rotation, the direction of oil flow being reversed but the sequence of flow being the same.

In order that air may escape from the oil-retaining chambers as they are being filled with oil, vent pipes may be provided in communication with said chambers. In the form shown, vent pipes 43 are in communication with the annular chambers 38 and 39 and, in order that the air may likewise escape through these pipes from the annular chambers 32 and 23, the keys 44 of the equalizing rings 8 fit loosely within their key-ways so that air may pass there-around. In order that air may not be sucked into one of said chambers as it is forced out of the other of said chambers, said vent pipes are preferably led to the oil reservoir and communicate with the same below the level of the oil therein. Therefore, if there is any tendency for air to be sucked into one of the chambers as the oil-retaining chambers are being filled with oil, oil will be drawn from the oil reservoir through the corresponding vent pipe and aid in priming the bearing.

If the pressure is maintained on the oil-retaining chamber at the right of the thrust collar in the embodiment of Figs. 1 to 3, there will be a tendency for the oil to leak past the contact ring 17. This oil may be suitably collected and returned to the oil reservoir. In the form shown, said oil is collected in a reservoir 45 beneath the guide bearing 46 and may be returned through the overflow pipe 47. Said pipe 47 may open into the oil reservoir at the level of the oil therein as shown at 48 or, if desired, said pipe may open beneath the level of the oil in said reservoir.

In the form shown in Figs. 4, 5 and 6, the horizontal shaft 50 carries a rotatable thrust collar 51 which may be retained thereon in any suitable way, as by the ring nut 52. Cooperating with the opposed faces of said collar 51 are bearing members of any suitable construction, shown as composed of a plurality of bearing segments or shoes 53 tiltably mounted on spherically-faced equalizing rings 54 which cooperate with spherically faced base rings 55 substantially as in the embodiment of Figs. 1 to 3.

The bearing housing 56 is provided with a generally cylindrical wall 57 the interior of which communicates through a passage 58 with an oil reservoir 59 suitably provided in said housing. The bearing members are disposed in oil-retaining chambers in said housing as in the embodiment of Figs. 1 to 3 and, to this end, contact rings 60, mounted in annular grooves 61 in the periphery of the thrust collar 51, are provided between said collar and the interior of the cylindrical wall 57. In order to prevent rotation of said rings with the thrust collar, they may be provided with keys 62 which interlock with the stationary oil collecting means to be described. The right-hand oil-retaining chamber is completed by the lateral wall 63 of the housing and the left-hand oil-retaining chamber is completed by a contact ring 64 between the opposite lateral wall 65 of said housing and the shaft 50.

In the form here shown, the oil collector is mounted to ride on the periphery of the thrust collar 51, between the contact rings 60, and takes the form of a generally arcuate base portion 66 provided at its opposite ends with diagonally-disposed oil-collecting and deflecting edges 67 and 68. Said oil collector may be also be provided with lateral notches 69 in which the keys 62 on the contact rings 60 engage, and with an upwardly extending transverse lug 70, which is designed to be received within a recess 71 provided in the wall of the housing and by which said oil collector is held stationary. The housing wall is suitably provided with oil passages 72 and 73 which communicate respectively with the spaces at the opposite sides of the oil collecting means. Said oil passages 72 and 73 also communicate respectively with annular chambers 74 and 75, which in turn respectively communicate with the radial spaces between the bearing segments or shoes 53 on the opposite sides of the thrust collar. The latter spaces respectively communicate through axial passages 76 and 77 with radial passages 78 and 79, which in turn respectively communicate with annular chambers 80 and 81 at the rear of the equalizing rings 54 and between said rings and the base rings 55. Said annular chambers 80 and 81 are in communication respectively through cored passages 82 and 83 with the opposite ends of an oil-cooling device 84 of any suitable construction. In the form shown, said oil-cooling device 84 is suitably attached to the base of the bearing housing and provided with oil-circulating passages 85 and water-circulating passages 86.

In this embodiment of the invention, the oil is maintained in the reservoir 59 at such a level, as indicated by the dotted line 87, that it flows into the annular space 88 between the periphery of the thrust collar and the cylindrical wall 57 on the one hand and between the contact rings 60 on the other hand, where it wets the lower portion of said thrust collar, said level preferably being maintained just below that of the bottom of the shaft. Oil is carried upwardly by the rotating peripheral surface of the thrust collar 51 and collected and deflected by the oil-collecting means. Assuming that the shaft is rotating in an anti-clockwise direction as viewed in Fig. 5, the oil is deflected into the passage 72 from which it flows to the annular chamber 74 and then radially inwardly through the spaces between the bearing segments or shoes and into operative relation with the bearing surfaces of said segments and the thrust collar in the oil-retaining chamber on the right-hand side of said collar. From the latter spaces, the oil flows through the axial passage 76 and then radially outwardly through the passages 78 to the annular chamber 80. From the latter, the oil flows through the cored passage 82 into and through the oil passages 85 in the oil-cooling device 84, and then flows through the passage 83 to the annular chamber 81. From the latter chamber the oil flows radially inwardly through the passages 79, then through the axial passage 77, and then outwardly through the radial spaces between the bearing segments or shoes 53 to the annular chamber 75. From the latter chamber the oil flows through the passage 73 to the rear of the oil-collecting means and then downwardly around the opposite side of the periphery of the thrust collar. If the direction of shaft rotation be reversed, the direction of oil circulation is reversed, the oil being first deflected into passage 73 and flowing through the oil-retaining chamber at the left-hand side of the thrust collar, then through the oil-cooling device, and then through the oil-retaining chamber at the right-hand side of the thrust collar. This arrangement of oil passages possesses the advantage that the oil as it is directed into either oil-retaining chamber by the oil-collecting means flows directly into contact with the bearing surfaces on the loaded side of the thrust collar. As the inlets of each of said oil-retaining chambers communicate only with the space at the oil-collecting side of the oil-collecting means the circulation of the oil through both chambers and the oil-cooling device is maintained under pressure as in the embodiment of Figs. 1 to 3.

The oil-retaining chambers of this embodiment are vented through annular chambers 89, provided at the rear of the filling rings 90, to which the air may flow from the oil-retaining chambers through suitable grooves 91 and through the spaces around the loosely-fitting keys 92. Said chambers 89 are vented into the oil reservoir 59 by suitable cored passages 93 opening beneath the level of the oil in said reservoir.

Any oil that escapes past the contact ring 64 is collected in an annular groove 94 provided in the lateral wall 65 of the housing, and from which the oil is returned to the oil reservoir through cored passages 95.

The structure shown in Figs. 4 to 6 possesses the additional advantage that all of the oil passages may be provided as cored openings in the walls of the bearing housing.

Figure 10:
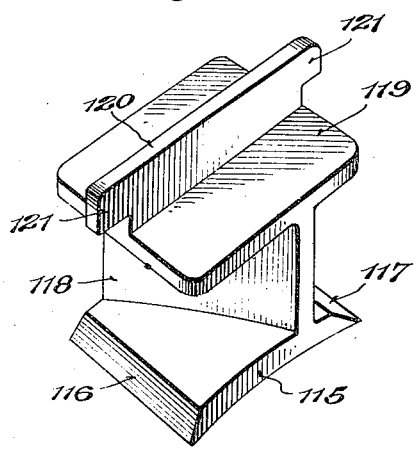
Fig. 10 is a detail perspective, on an enlarged scale, of the oil collector employed in the embodiment of Figs. 7 to 9.
Figure 11:
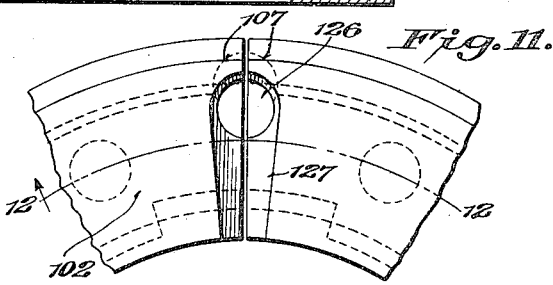
Fig. 11 is an enlarged fragmentary plan showing extensions on the bearing segments and oil passages therethrough.
Figure 12:
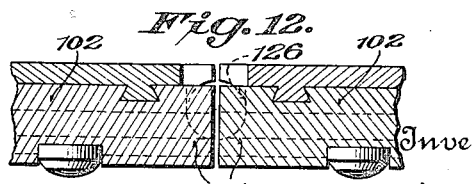
Fig. 12 is a developed cross section on the line 12—12 of Fig. 11.

In the form shown in Figs. 7 to 12, the horizontal shaft 100 is provided with a thrust collar 101 retained thereon in any suitable way. Cooperating with the opposed faces of said thrust collar are bearing members of any suitable construction, shown as a plurality of bearing segments or shoes 102 tiltably mounted on equalizing means of any suitable construction, shown as a sub-divided equalizing ring 103 mounted in a channel shaped base ring 104. The bearing housing 105 is provided with a generally cylindrical wall 106 in which oil-retaining chambers are provided by forming the bearing segments or shoes 102 with extensions 107 which are designed to closely approach each other and form in effect an oil-retaining partition between the annular space 108 between the periphery of the thrust collar and the generally cylindrical wall 106 on the one hand and the spaces within which said bearing segments or shoes are disposed on the other hand. The bearing housing 105 is provided with an oil reservoir 109 which is divided interiorly in that portion which surrounds the cylindrical wall 106 into two chambers 110 and 111 by a partition 112. Said chambers 110 and 111 communicate respectively with the annular space 108 through oil passages 113 and 114. The oil carried upwardly by the periphery of the thrust collar is collected and deflected by an oil-collector of the general construction employed in the embodiment of Figs. 1 to 3. This oil collector is illustrated more particularly in Fig. 10 and comprises the arcuate lower portion 115 designed to ride on the periphery of the thrust collar and having at its opposite ends oil-collecting edges 116 and 117; a diagonal upstanding partition 118; and a substantially horizontal upper portion 119, which is shown as provided with a vertical lug 120 having end projections 121 designed to be received in recesses 122 in the wall of the main recess 123 in which the oil collector fits closely. The inter-engagement of said extensions 121 with the recesses 122 insures against the oil collector dropping out if the upper half of the bearing housing is removed from the lower half. The oil-collecting edges 116 and 117 preferably extend the full width of the periphery of the thrust collar, and may overhang said periphery, as there are no contact rings which might otherwise engage and wear or jam with the oil collector.

The spaces in the recess 123 at the two sides of the diagonal partition 118 are in communication respectively with annular chambers 124 and 125, which in turn communicate through inclined passages 126, formed in the channel shaped base ring 104 and the extensions 107 of the bearing segments 102, with the radial spaces 127 between the segments or shoes 102. The radial speces between the bearing segments on the two sides of the thrust collar respectively communicate through axial passages 128 and 129 with radial passages 130 and 131 in the channel-shaped base ring 104, and these radial passages in turn communicate respectively with annular chambers 132 and 133. Said annular chambers 132 and 133 are in turn in communication respectively through pipes 134 and 135 with an oil-cooling device 136 of any suitable construction and shown as provided in a chamber in the bearing housing.

The oil is maintained in the reservoir 109 at such a level that it may flow through the passages 113 or 114 and wet the lower portion of the thrust collar 101 but said level is preferably lower than the underside of the shaft 100. The periphery of the thrust collar constitutes a rotatable oil-carrying surface which carries the oil to the oil-collecting means. Assuming that the thrust collar is rotating in a clockwise direction, in the arrangement shown in Fig. 9, oil is collected from the oil-carrying surface by the edge 116 and deflected laterally by the diagonal partition 118 into the annular space 124. From said annular space the oil flows through the oil passages 126 into the radial spaces 127 between the bearing segments or shoes and lubricates the bearing surfaces in the oil-retaining chamber on the right-hand side of the thrust collar. The oil then flows axially through the passage 128, radially through the passages 130, through the annular chamber 132 into the pipe 134, and then to one end of the oil-cooling device 136. After circulating through the latter, the oil returns through the pipe 135 to the annular chamber 133, whence it flows inwardly through the passages 131, axially through the passage 129, and then radially outwardly through the spaces 127 between the bearing segments or shoes in the oil-retaining chamber at the left-hand side of the thrust collar. From the latter spaces the oil flows through the oil passages 126 in the extensions of the bearing segments or shoes, and then through the annular chamber 124 to the opposite side of the partition 118, whence it flows down the opposite side of the thrust collar. From the rear side of the thrust collar the oil may be returned directly to the forward side of the thrust collar, or it may be returned to the oil reservoir. In the embodiment shown in Figs. 7 to 12, a transverse strip 137 is shown suitably attached to the cylindrical wall 106 between the oil passages 113 and 114 to substantially fill the space between the periphery of the thrust collar and the generally cylindrical wall 106 and prevent the flow of oil therepast from one side of the annular space 108 to the other. Therefore, the oil flowing down the rear side of the thrust collar flows through passage 114 into the chamber 110 and is returned to the oil reservoir, thereby insuring that the oil flowing out of said passage 113 will not be returned to the oil collecting means before it flows to the oil reservoir 109 to mingle with the larger mass of oil therein.

If the direction of shaft rotation be reversed the oil flows from chamber 111 through passage 114 into annular space 108, whence it is carried up by the rotating periphery of the thrust collar, collected and deflected by the oil collector into the oil-retaining chamber at the left-hand side of the thrust collar, whence it flows through the oil-cooling device and the oil-retaining chamber at the right-hand side of the thrust collar, and then back around the opposite side of the thrust collar and out through the passage 113 into the chamber 110 of the oil reservoir. In either event the inlet to the chamber into which the oil is first directed is in communication only with the oil-collecting side of the oil-collecting means, whereby the oil in said chamber is maintained under a pressure by the pumping action of the rotatable oil-carrying surface and said oil circulation is maintained through both of said oil-retaining chambers and the oil-cooling device for either direction of shaft rotation.

The bearing of Figs. 4 to 6 may also be provided, if desired, with a transverse strip 137 to prevent the oil, returning from the rear side of the thrust collar, from flowing directly to the forward side thereof.

The outer ends of the oil-retaining chambers in the embodiment of Figs. 7 to 12 are shown as closed by contact rings 140. Part of the oil escaping past said contact rings collects in the annular chambers 141 and flows through the passages 142 into the chambers 143. Some of the oil works along the shaft to lubricate the guide bearings 144 but, after flowing through said guide bearings, is collected in the annular chambers 145 and flows through the passages 146 into the chambers 143. Packing glands 147 are preferably provided at the outer ends of the journal bearings to prevent leakage along the shaft to the exterior of the bearing housing. The oil that collects in the chambers 143 is returned to the oil reservoir 109 through cored passages in the housing wall. The oil-retaining chambers of this embodiment may be vented in any suitable way, as in the embodiment of Figs. 4 to 6.

In the form shown in Figs. 13 to 16, the horizontal shaft 150 is provided with a rotatable thrust collar 151 mounted thereon in any suitable way. Cooperating with the opposed faces of said thrust collar are bearing members of any suitable construction, shown as composed of a plurality of bearing segments or shoes 152 tiltably mounted on equalizing means of any suitable construction, shown as sub-divided equalizing rings 153 which are in turn mounted in channel-shaped base rings 154, with spacing rings 155 interposed between the same and the wall of the bearing housing 156. Said bearing housing is provided with an oil reservoir 157 which is divided by a partition 158 into two chambers 159 and 160 which communicates through one or more apertures 161. Said chambers 159 and 160 respectively communicate with the space 162 within the generally cylindrical wall 163 through oil passages 164 and 165.

In the embodiment here illustrated the oil collecting and deflecting means is shown as provided on a ring 166 which is adapted to surround the periphery of the thrust collar and which may be formed in separable halves that can be suitably connected, as by bolts 167. Said ring is provided adjacent its bottom with two apertures 168 and 169 and, intermediate said apertures, with a transverse lug or projection 170 which is adapted to engage the periphery of the thrust collar and separate the annular space at one side of said projection from the annular space at the opposite side thereof. At its upper portion, said ring is provided with an inwardly extending transverse lug or projection 171 which is also designed to engage the periphery of the thrust collar and collect and deflect oil therefrom. An upwardly-extending projection 172 may also be provided to facilitate removal of the upper half of said ring. Rotation of said ring 166 may be prevented in any suitable way as by the provision thereon of an outwardly-extending projection 173 which is designed to engage an inwardly-extending lug 174 on the bearing housing, while other inwardly extending lugs 175 on the bearing housing may engage the projections 176 on the ring 166 afforded by the bosses which receive the connecting bolts 167.

The oil collected from the periphery of the thrust collar by the oil-collecting projection 171 is deflected into one or the other of two annular chambers 177 and 178, which communicate respectively with the radial spaces between the bearing segments or shoes 152 on the two sides of the thrust collar. Said radial spaces also communicate at their inner ends with axial passages 179 and 180 which in turn communicate respectively with radial passages 181 and 182 in the channel-shaped base rings 154. Said last-named passages communicate respectively with annular chambers 183 and 184, which in turn communicate respectively through cored passages 185 and 186 in the wall of the bearing housing with a cooling device of any suitable construction, shown as positioned in a chamber 187 in said bearing housing.

Assuming that the shaft is rotated in a clockwise direction (see Fig. 15) the oil flows from the oil reservoir 157 through the chamber 159, passage 164 and aperture 168 into the annular space 188 between the periphery of the thrust collar and the ring 166 where it wets the periphery of said thrust collar, the oil in the reservoir preferably being maintained at a level below that of the bottom of the shaft. The oil carried up by the rotating periphery of the thrust collar is collected and deflected by the transverse projection 171 and flows into the annular chamber 177 (see Fig. 14), whence it flows through the radial spaces between the bearing segments or shoes 152, axially through the passage 179, radially through the passages 181, and then through the annular chamber 183 and the cored passage 185 to the oil-cooling devices 187. From the latter, the oil flows through the cored passage 186, through the annular chamber 184, the radial passages 182 and the axial passage 180 to and through the spaces between the bearing segments or shoes 152, and then through the annular chamber 178 to the opposite side of the oil-collecting projection 171, whence it flows through the annular space around the opposite side of the thrust collar and out through the aperture 169 in the ring 166 and the oil passage 165 into the chamber 160 of the oil reservoir. The transverse projection 170 prevents the oil flowing down the rear side of the thrust collar from being carried up by the forward side of the thrust collar, and insures that it shall flow back through the aperture 169, the passage 165 and the chamber 160 to the body of the oil in the reservoir 157. If the direction of rotation of the shaft is reversed the oil flows from the chamber 160 through passage 165 and aperture 169 to the periphery of the thrust collar, by which it is carried up and thereafter collected and deflected by projection 171 into the oil-retaining chamber at the right-hand side of the thrust collar. From said chamber it flows through the cooling device to the oil-retaining chamber at the left-hand side of the thrust collar, and then is returned to the oil reservoir around the opposite side of the thrust collar. In either event the inlet of the oil-retaining chamber into which the oil is first directed is in communication only with the space at the oil-collecting side of the oil-collecting means whereby the oil in the chamber into which it is first directed is maintained under a pressure by the pumping action of the oil-carrying surface and the oil circulation is maintained through both said chambers and the oil-cooling device.

The oil-retaining chambers may be vented in any suitable way, as by the provision of annular chambers 189 in the spacing rings 155, to which the air may escape around the loosely fitting keys 190 and through grooves 191. Said chambers 189 communicate through cored passages 192 with the oil reservoir beneath the level of the oil therein.

The embodiment of the invention illustrated in Figs. 13 to 16 also shows how one or more journal bearings may be supplied with lubricant by the pressure to which the oil is subjected in its circuit through the oil-retaining chambers and oil-cooling device. As the oil is subjected to a pressure as it passes through the oil-cooling device, the pressure on the oil therein may be conveniently utilized for causing circulation to and through one or more guide bearings. In the form shown, an oil passage 193 is suitably provided, as by a cored passage in the wall of the bearing housing, to communicate with a suitable point in the length of the oil-cooling device and with other cored passages 194 and 195 (see Fig. 15) leading to the guide bearing 196 and with yet other cored passages 197 and 198 (see Fig. 16) leading to the other guide bearing 199. The oil flowing through the guide bearings is collected in annular chambers 200 and 201 at the opposite ends thereof, whence it returns to the oil reservoir through passages 202 and 203. Packing glands 204 are preferably provided at the outer ends of the guide bearings to prevent oil leakage along the shaft and contact-rings 205 are preferably provided between the oil-retaining chambers and the guide bearings to minimize leakage therebetween.

It will therefore be perceived that in all of the embodiments of the invention illustrated an oil-circulating system has been provided whereby a plurality of oil-retaining chambers are supplied with oil collected from a rotatable oil-carrying surface by oil-collecting means so related to said chambers that the oil is maintained under pressure in the chamber into which it is first directed and whereby circulation of said oil through the other oil-retaining chambers is maintained. Moreover an oil-circulating system has been provided whereby said pressure on the oil and the circulation thereof is maintained in whichever direction the shaft is rotated. While said pressure may be utilized solely for causing more rapid circulation through the oil-retaining chambers in succession, means have been provided whereby the pressure on the oil is utilized to cause circulation thereof through an oil-cooling device, or through one or more guide bearings, or through both. It will also be perceived that an improved oil-circulating system has been provided whereby the oil is circulated in succession through a plurality of chambers in which bearing members are disposed and through an oil-cooling device in the connections between successive chambers. It will also be perceived that an oil-circulating system has been provided which enables circulation of the oil under pressure without the use of external pumping means and yet which is simple in construction, efficient in operation and available for use with either or both directions of shaft rotation.

While the oil-retaining chambers have been shown as positioned on opposite sides of the thrust collar as the preferred arrangement, particularly where the thrust bearing is designed to take thrust in opposite directions, the invention is not limited thereto as it is applicable to a plurality of oil-retaining chambers disposed on the same side of the thrust collar and may also be employed in a bearing that is designed to take thrust in but a single direction. While the embodiments of the invention illustrated on the drawings have been described with considerable particularity, it is to be expressly understood that the invention is not limited thereto, as the same is capable of receiving a variety of mechanical expressions, some of which will readily suggest themselves to those skilled in the art, while certain features thereof may be used without other features thereof. Changes may also be made in details of construction, proportion and arrangement of parts without departing from the spirit of the invention. Reference is therefore to be had to the claims hereto appended for a definition of the limits of this invention, wherein the term "horizontal thrust bearing" is to be construed as generic to thrust bearings for suitably inclined shafts as well as to thrust bearings for horizontal shafts.

What is claimed is:

1. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into one of said oil-retaining chambers, said oil-collecting means being so related to said chamber that a pressure is maintained on the oil therein, and connections whereby the oil is circulated through the other of said oil-retaining chambers by the pressure on the oil in said first chamber.

2. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into one of said oil-retaining chambers, the inlet of said chamber communicating only with the space at the oil-collecting side of said oil-collecting means whereby a pressure is maintained on the oil in said chamber, and connections whereby the oil is circulated through the other of said oil-retaining chambers by the pressure on the oil in said first chamber.

3. In a horizontal thrust bearing, relatively rotatable bearing members, a housing for said bearing including two oil-retaining chambers in which said bearing members are disposed, a rotatable oil-carrying surface, means for collecting oil from said oil-carrying surface and directing it into one or the other of said oil-retaining chambers as said oil-carrying surface rotates in one direction or the other, said oil-collecting means being so related to said chambers that a pressure is maintained on the oil in the chamber into which it is directed, and connections whereby the oil is circulated through the other of said oil-retaining chambers by the pressure on the oil in the chamber into which it is first directed.

4. In a horizontal thrust bearing, relatively rotatable bearing members, a housing for said bearing including two oil-retaining chambers in which said bearing members are disposed, a rotatable oil-carrying surface, means for collecting oil from said oil-carrying surface and directing it into one or the other of said oil-retaining chambers as said oil-carrying surface rotates in one direction or the other, each of said chambers having its inlet in communication only with the space on one side of said oil-collecting means whereby a pressure is maintained on the oil in one or the other of said chambers as the oil-carrying surface rotates in one direction or the other, and connections whereby the oil is circulated through the other of said oil-retaining chambers by the pressure on the oil in the chamber into which it is first directed.

5. In a horizontal thrust bearing, a rotatable thrust collar, bearing members cooperating with the opposed faces of said thrust collar, oil-retaining chambers on the opposite sides of said thrust collar in which said bearing members are disposed, means for collecting oil from an oil-carrying surface of said thrust collar and directing it into an oil-retaining chamber on one side of said thrust collar, said oil-collecting means being so related to said chamber that a pressure is maintained on the oil therein, and connections whereby the oil is circulated through the oil-retaining chamber on the opposite side of said thrust collar by the pressure on the oil in said first chamber.

6. In a horizontal thrust bearing, a rotatable thrust collar, bearing members cooperating with the opposed faces of said thrust collar, oil-retaining chambers on the opposite sides of said thrust collar in which said bearing members are disposed, means for collecting oil from an oil-carrying surface of said thrust collar and directing it into an oil-retaining chamber on one side of said thrust collar, the inlet of said chamber communicating only with the space at the oil-collecting side of said oil-collecting means, and connections whereby the oil is circulated through the oil-retaining chamber on the opposite side of said thrust collar by the pressure on the oil in said first chamber.

7. In a horizontal thrust bearing, a rotatable thrust collar, bearing members cooperating with the opposed faces of said thrust collar, an oil-retaining chamber on each side of said thrust collar in which said bearing members are disposed, means for collecting oil from an oil-carrying surface of said thrust collar and directing it into one or the other of said oil-retaining chambers as said thrust collar rotates in one direction or the other, said oil-collecting means being so related to said chambers that a pressure is maintained on the oil in the chamber into which it is directed, and connections whereby the oil is circulated through the other of said oil-retaining chambers by the pressure on the oil in the chamber into which it is first directed.

8. In a horizontal thrust bearing, a rotatable thrust collar, bearing members cooperating with the opposed faces of said thrust collar, an oil-retaining chamber on each side of said thrust collar in which said bearing members are disposed, means for collecting oil from an oil-carrying surface of said thrust collar and directing it into one or the other of said oil-retaining chambers as said thrust collar rotates in one direction or the other, each of said chambers having its inlet in communication only with the space on that side of said oil-collecting means which is the oil-collecting side for said chamber, and connections whereby the oil is circulated through the other of said oil-retaining chambers by the pressure on the oil in the chamber into which it is first directed.

9. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into one or another of said oil-retaining chambers as said oil-carrying surface rotates in one direction or the other, and connections whereby the oil flows from the oil-retaining chamber into which it is first directed to the other of said chambers in whichever direction said oil-carrying surface rotates.

10. In a horizontal thrust bearing, a rotatable thrust collar, bearing members cooperating with the opposed faces of said thrust collar, an oil-retaining chamber on each side of said thrust collar in which said bearing members are disposed, means for collecting oil from an oil-carrying surface of said thrust collar and directing it into one or the other of said oil-retaining chambers as the thrust collar rotates in one direction or the other, and connections whereby the oil flows from the oil-retaining chamber into which it is first directed to the chamber on the opposite side of said thrust collar in whichever direction said thrust collar is rotating.

11. In a horizontal thrust bearing, relatively, rotatable bearing members, a housing for said bearing including two oil-retaining chambers in which said bearing members are disposed, a rotatable oil-carrying surface, means for collecting oil from said oil-carrying surface and directing it into the respective oil-retaining chambers, the inlet of one of said chambers communicating only with the space at one side of said oil-collecting means and the inlet of the other chamber communicating only with the space at the other side of said oil-collecting means, and connections between said chambers whereby the oil may circulate from one to the other.

12. In a horizontal thrust bearing, a rotatable thrust collar, bearing members cooperating with the opposed faces of said thrust collar, an oil-retaining chamber on each side of said thrust collar in which said bearing members are disposed, means for collecting oil from an oil-carrying surface of said thrust collar and directing it into the respective oil-retaining chambers, the inlet of the chamber on one side of said thrust collar communicating only with the space at one side of said oil-collecting means and the inlet of the chamber at the other side of said thrust collar communicating only with the space at the opposite side of said oil-collecting means, and connections between said chambers whereby the oil may circulate from one to the other.

13. In a horizontal thrust bearing, relatively rotatable bearing members, a housing for said bearing including a plurality of oil-retaining chambers in which said bearing members are disposed, connections between said oil-retaining chambers whereby the oil may flow from one to the other, a rotatable oil-carrying surface, and means for collecting oil from said oil-carrying surface and directing it into said chambers and so related thereto that a pressure is maintained on said oil to cause circulation thereof through both of said chambers in whichever direction said oil-carrying surface rotates.

14. In a horizontal thrust bearing, a rotatable thrust collar, bearing members co-operating with the opposed faces of said collar, an oil-retaining chamber on each side of said thrust collar in which said bearing members are disposed, connections between said oil-retaining chambers whereby the oil may flow from one to the other, and means for collecting oil from an oil-carrying surface of said thrust collar and directing it into said chambers and so related thereto that a pressure is maintained on said oil to cause circulation thereof through the oil-retaining chambers on both sides of the thrust collar in whichever direction said thrust collar is rotated.

15. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into one of said oil-retaining chambers, and connections whereby the oil flows from said first chamber to the other of said oil-retaining chambers.

16. In a horizontal thrust bearing, a rotatable thrust collar, bearing members cooperating with the opposed faces of said thrust collar, oil-retaining chambers on the opposite sides of said thrust collar in which said bearing members are disposed, means for collecting oil from an oil-carrying surface of said thrust collar and directing it into an oil-retaining chamber on one side of said thrust collar, and connections whereby the oil flows from said first chamber to the oil-retaining chamber on the other side of said thrust collar.

17. In a horizontal thrust bearing, relatively rotatable bearing members, a housing for said members including a plurality of oil-retaining chambers in which said bearing members are disposed, a rotatable oil-carrying surface, means for collecting oil from said oil-carrying surface and directing it into one of said oil-retaining chambers, said oil-collecting means being so related to said chamber that a pressure is maintained on the oil therein, an oil-cooling device communicating with the outlet of said chamber, and connections from said oil-cooling device to the other of said oil-retaining chambers whereby the oil is circulated through said oil-cooling device and said last-named chamber by the pressure on the oil in said first-named chamber.

18. In a horizontal thrust bearing, relatively rotatable bearing members, a housing for said members including a plurality of oil-retaining chambers in which said bearing members are disposed, a rotatable oil-carrying surface, means for collecting oil from said oil-carrying surface and directing it into one of said oil-retaining chambers, the inlet of said chamber communicating only with the space at the oil-collecting side of said oil-collecting means whereby a pressure is maintained on the oil in said chamber, an oil-cooling device communicating with the outlet of said chamber, and connections from said oil-cooling device to the other of said oil-retaining chambers whereby the oil is circulated through said oil-cooling device and said last-named chamber by the pressure on the oil in said first-named chamber.

19. In a horizontal thrust bearing, relatively rotatable bearing members, a housing for said bearing including two oil-retaining chambers in which said bearing members are disposed, a rotatable oil-carrying surface, means for collecting oil from said oil-carrying surface and directing it into one or the other of said oil-retaining chambers as said oil-carrying surface rotates in one direction or the other, said oil-collecting means being so related to said chambers that a pressure is maintained on the oil in the chamber into which it is first directed, and an oil-cooling device connected to both of said chambers and through which the oil is circulated to the other of said chambers by the pressure on the oil in said first chamber in whichever direction said oil-carrying surface rotates.

20. In a horizontal thrust bearing, relatively rotatable bearing members, a housing for said bearing including two oil-retaining chambers in which said bearing members are disposed, a rotatable oil-carrying surface, means for collecting oil from said oil-carrying surface and directing it into one or the other of said oil-retaining chambers as said oil-carrying surface rotates in one direction or the other, each of said chambers having its inlet in communication only with the space at one side of said oil-collecting means whereby a pressure is maintained on the oil in one or the other of said chambers as the oil-carrying surface rotates in one direction or the other, and an oil-cooling device connected to both of said chambers and through which the oil is circulated to the other of said chambers by the pressure on the oil in said first chamber in whichever direction said oil-carrying surface rotates.

21. In a horizontal thrust bearing, a rotatable thrust collar, bearing members cooperating with the opposed faces of said thrust collar, an oil-retaining chamber on each side of said thrust collar in which said bearing members are disposed, means for collecting oil from an oil-carrying surface of said thrust collar and directing it into an oil-retaining chamber on one side of said thrust collar, said oil-collecting means being so related to said chamber that a pressure is maintained on the oil therein, an oil-cooling device communicating with the outlet of said oil-retaining chamber, and connections from said oil-cooling device to the other of said oil-retaining chambers.

22. In a horizontal thrust bearing, a rotatable thrust collar, bearing members cooperating with the opposed faces of said thrust collar, an oil-retaining chamber on each side of said thrust collar in which said bearing members are disposed, means for collecting oil from an oil-carrying surface of said thrust collar and directing it into an oil-retaining chamber on one side of said thrust collar, the inlet of said chamber communicating only with the space at the oil-collecting side of said oil-collecting means, an oil-cooling device communicating with the outlet of said oil-retaining chamber, and connections from said oil-cooling device to the other of said oil-retaining chambers.

23. In a horizontal thrust bearing, a rotatable thrust collar, bearing members cooperating with the opposed faces of said thrust collar, an oil-retaining chamber at each side of said thrust collar in which said bearing members are disposed, means for collecting oil from an oil-carrying surface of said thrust collar and directing it into the oil-retaining chamber on one side or the other of said thrust collar as said collar rotates in one direction or the other, said oil-collecting means being so related to said chambers as to maintain a pressure on the oil in the chamber into which it is first directed, and an oil-cooling device in communication with both of said chambers and through which the oil flows to the other of said chambers in whichever direction said thrust collar rotates.

24. In a horizontal thrust bearing, a rotatable thrust collar, bearing members cooperating with the opposed faces of said thrust collar, an oil-retaining chamber at each side of said thrust collar in which said bearing members are disposed, means for collecting oil from an oil-carrying surface of said thrust collar and directing it into the oil-retaining chamber on one side or the other of said thrust collar as said collar rotates in one direction or the other, the inlet of each of said chambers communicating only with the space at that side of the oil-collecting means which is the oil-collecting side for said chamber, and an oil-cooling device in communication with both of said chambers and through which the oil flows to the other of said chambers in whichever direction said thrust collar rotates.

25. In a horizontal thrust bearing, relatively rotatable bearing members, a housing for said bearng including a plurality of oil-retaining chambers in which said bearing members are disposed, a rotatable oil-carrying surface, means for collecting oil from said oil-carrying surface and directing it into one of said oil-retaining chambers, and an oil-cooling device having its inlet in communication with said oil-retaining chamber and its outlet in communication with the other of said oil-retaining chambers.

26. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into one or the other of said oil-retaining chambers as the oil-carrying surface rotates in one direction or the other, an oil-cooling device, and connections between said oil-cooling device and both of said chambers whereby the oil is circulated through said oil-cooling device and both of said chambers in whichever direction said oil-carrying surface rotates.

27. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into said chambers, one of said chambers communicating only with the space at one side of said oil-collecting means and the other of said chambers communicating only with the space at the other side of said oil-collecting means, and an oil-cooling device in communication with both of said oil-retaining chambers.

28. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into said chambers, said oil-collecting means being so related to said chambers that a pressure is maintained on the oil to cause circulation thereof through both of said chambers in whichever direction said oil-carrying surface rotates, and an oil-cooling device through which the oil circulates as it flows from one chamber to the other.

29. In a horizontal thrust bearing, a rotatable thrust collar, bearing members cooperating with the opposed faces of said thrust collar, an oil-retaining chamber on each side of said thrust collar in which said bearing members are disposed, means for collecting oil from an oil-carrying surface of said thrust collar and directing it into the oil-retaining chamber on one side or the other of said thrust collar as said collar rotates in one direction or the other, and an oil-cooling device in communication with both of said oil-retaining chambers and through which the oil is circulated in whichever direction said thrust collar rotates.

30. In a horizontal thrust bearing, a rotatable thrust collar, bearing members cooperating with the opposed faces of said thrust collar, an oil-retaining chamber on each side of said thrust collar in which said bearing members are disposed, means for collecting oil from an oil-carrying surface of said thrust collar and directing it into said oil-retaining chambers, one of said chambers having its inlet in communication only with the space at one side of said oil-collecting means and the other of said chambers having its inlet in communication only with the space at the opposite side of said oil-collecting means, and an oil-cooling device in communication with both of said oil-retaining chambers.

31. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into one of said oil-retaining chambers and so related thereto that a pressure is maintained on the oil therein, connections between said oil-retaining chambers whereby the oil may flow from one chamber to the other, a guide bearing, and an oil passage from said connections to said guide bearing.

32. In a horizontal thrust bearing, relatively rotatable bearing members, a housing for said bearing including a plurality of oil-retaining chambers in which said bearing chambers are disposed, a rotatable oil-carrying surface, means for collecting oil from said oil-carrying surface and directing it into one or the other of said oil-retaining chambers as the oil-carrying surface rotates in one direction or the other, said oil-collecting means being so related to said chambers that a pressure is maintained on the oil in that chamber into which it is first directed, connections between said oil-retaining chambers, a guide bearing, and an oil passage from said connections to said guide bearing.

33. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into one or the other of said oil-retaining chambers as the oil-carrying surface rotates in one direction or the other, a guide bearing, an oil passage leading thereto, and connections between said oil-retaining chambers with which said oil passage communicates whereby said guide bearing is supplied with oil in whichever direction said oil-carrying surface rotates.

34. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into said oil-retaining chambers, a guide bearing, an oil passage leading thereto, and connections between said chambers with which said oil passage communicates, said oil-collecting means being so related to said oil-retaining chambers that a pressure is maintained on the oil whereby it is circulated through both of said chambers and flows to said guide bearing in whichever direction said oil-carrying surface rotates.

35. In a horizontal thrust bearing, a rotatable thrust collar, bearing members cooperating with the opposed faces of said thrust collar, an oil-retaining chamber at each side of said thrust collar in which said bearing members are disposed, means for collecting oil from an oil-carrying surface of said thrust collar and directing it into the oil-retaining chamber on one side of said collar or the other as said collar rotates in one direction or the other, said oil-collecting means being so related to said chambers that a pressure is maintained on the oil in the chamber into which it is first directed, connections between said oil-retaining chambers, a guide bearing, and an oil passage from said connections to said guide bearing.

36. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into one or another of said chambers as said oil-carrying surface rotates in one direction or the other, the inlet of each of said chambers communicating only with the space at that side of said oil-collecting means which is the oil-collecting side for said chamber, connections between said oil-retaining chambers whereby the oil flows from one to and through the other of said chambers under the pressure maintained on the oil in the chamber into which it is first directed, and a guide bearing supplied with oil by the pressure on the oil in said connections.

37. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into one or another of said chambers as said oil-carrying surface rotates in one direction or the other, the inlet of each of said chambers communicating only with the space at that side of said oil-collecting means which is the oil-collecting side for said chamber, connections between said oil-retaining chambers whereby the oil flows from one to and through the other of said chambers under the pressure maintained on the oil in the chamber into which it is first directed, an oil-cooling device interposed in said connections and through which the oil circulates under said pressure, and a guide bearing supplied with oil by the pressure on the oil in said oil-cooling device.

38. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into one of said oil-retaining chambers, said oil-collecting means being so related to said chamber that a pressure is maintained on the oil therein, an oil-cooling device communicating with both of said chambers and through which and the other of said chambers the oil is circulated by the pressure on the oil in said first chamber, a guide bearing, and an oil passage thereto communicating with said oil-cooling device whereby the oil flows to said guide bearing under the pressure on the oil in said oil-cooling device.

39. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into one or the other of said oil-retaining chambers as said oil-carrying surface is rotated in one direction or the other, said oil-collecting means being so related to said chambers that a pressure is maintained on the oil in the chamber into which it is first directed, an oil-cooling device communicating with both of said chambers and through which the oil circulates in whichever direction said oil-carrying surface rotates, a guide bearing, and an oil passage thereto communicating with said oil-cooling device whereby the oil flows to said guide bearing under the pressure on the oil in said oil-cooling device.

40. In a horizontal thrust bearing, a rotatable thrust collar, bearing members cooperating with the opposed faces of said thrust collar, an oil-retaining chamber at each side of said thrust collar in which said bearing members are disposed, means for collecting oil from an oil-carrying surface of said thrust collar and directing it into the oil-retaining chamber on one side of said collar or the other as said collar rotates in one direction or the other, said oil-collecting means being so related to said chambers that a pressure is maintained on the oil in the chamber into which it is first directed, an oil-cooling device in communication with both of said chambers and through which the oil circulates in whichever direction said collar rotates, a guide bearing, and an oil passage thereto communicating with said oil-cooling device whereby oil flows to said guide bearing under the pressure on the oil in said oil-cooling device.

41. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into one or the other of said oil-retaining chambers as said oil-carrying surface rotates in one direction or the other, an oil-cooling device communicating with both of said chambers and through which the oil circulates in whichever direction said oil-carrying surface rotates, a guide bearing, and an oil passage thereto communicating with said oil-cooling device.

42. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into one or another of said oil-retaining chambers as said oil-carrying surface rotates in one direction or the other and so related to said chambers that a pressure is maintained on the oil in the chamber into which it is first directed, connections between said oil-retaining chambers whereby the oil circulates through all of said chambers, an oil reservoir for supplying said oil-carrying surface with oil, and one or more pipes for venting said oil-retaining chambers communicating with said oil reservoir below the level of the oil therein.

43. In a horizontal thrust bearing, relatively rotatable bearing members, a housing for said members including an oil-retaining chamber in which one or more of said bearing members are disposed, a rotatable oil-carrying surface, means for collecting oil from said oil-carrying surface and directing it into said oil-retaining chamber and so related thereto that a pressure is maintained on the oil in said chamber, an oil reservoir for supplying said oil-carrying surface with oil, and a pipe for venting said oil-retaining chamber opening into said oil reservoir below the level of the oil therein.

44. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into either of said oil-retaining chambers, the inlet of one of said chambers communicating only with the space at one side of said oil-collecting means and the inlet of the other of said chambers communicating only with the space at the opposite side of said oil-collecting means, and connections between said oil-retaining chambers whereby the oil directed into either of said chambers may circulate through the other of said chambers and flow out through the inlet of said latter chamber.

45. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into either of said oil-retaining chambers, the inlet of one of said chambers communicating only with the space at one side of said oil-collecting means and the inlet of the other of said chambers communicating only with the space at the opposite side of said oil-collecting means, and connections between said oil-retaining chambers whereby the oil directed into either of said chambers may circulate through the other of said chambers and flow out through the inlet of said latter chamber, the space at the two sides of said oil-collecting means being in communication adjacent the lower side of said oil-carrying surface whereby the oil flowing out of said last-named chamber may be returned to the oil-collecting side of said oil-collecting means.

46. In a horizontal thrust bearing, a rotatable thrust collar, bearing members cooperating with said thrust collar, a housing for said bearing, means cooperating with said housing and thrust collar to provide oil-retaining chambers in which said bearing members are disposed, means for collecting oil from an oil-carrying surface of said thrust collar and directing it into either of said oil-retaining chambers and so related thereto that a pressure is maintained on the oil in the chamber into which it is first directed, and connections between said oil-retaining chambers whereby the oil may circulate through the other of said chambers under the pressure on the oil in the chamber into which it is first directed.

47. In a horizontal thrust bearing, a rotatable thrust collar, a plurality of bearing segments cooperating with said thrust collar and provided with extensions to form oil-retaining chambers in which the bearing surfaces are disposed, means for collecting oil from an oil-carrying surface of said thrust collar and directing it into either of said oil-retaining chambers and so related thereto that a pressure is maintained on the oil in the chamber into which it is first directed, and connections between said oil-retaining chambers whereby the oil may circulate through the other of said chambers under the pressure on the oil in the chamber into which it is first directed.

48. In a horizontal thrust bearing, a rotatable thrust collar, a plurality of bearing segments cooperating with said thrust collar, said segments having extensions to provide oil-retaining chambers in which the bearing surfaces are disposed and oil passages through which the oil may reach said bearing surfaces, means for collecting oil from an oil-carrying surface of said thrust collar and directing it into either of said oil-retaining chambers and so related thereto that a pressure is maintained on the oil in the chamber into which it is first directed, and connections between said oil-retaining chambers whereby the oil may circulate through the other of said chambers under the pressure on the oil in the chamber into which it first directed.

49. In a horizontal thrust bearing, relatively rotatable bearing members, a housing for said bearing including a plurality of oil-retaining chambers in which said bearing members are disposed, a rotatable oil-carrying surface, means for collecting oil from said oil-carrying surface and directing it into either of said oil-retaining chambers and so related thereto that a pressure is maintained on the oil in the chamber into which it is first directed, connections between said oil-retaining chambers whereby the oil may circulate through all of said chambers by the pressure to which it is subjected in said first chamber, an oil reservoir, and means whereby the oil flowing from said chambers must return to said oil reservoir before it is again picked up by said oil-carrying surface.

50. In a horizontal thrust bearing, a rotatable thrust collar, bearing members cooperating therewith, a plurality of oil-retaining chambers in which said bearing members are disposed, means for collecting oil from an oil-carrying surface of said collar and directing it into either of said oil-retaining chambers, the inlet of one of said chambers communicating only with the space at one side of said oil-collecting means and the inlet of the other of said chambers communicating only with the space at the opposite side of said oil-collecting means, connections between said oil-retaining chambers whereby the oil may circulate through all of said chambers, an oil reservoir, and means separating the space at the two sides of said oil-collecting means whereby the oil flowing from said chambers must return to the oil reservoir before flowing to the space at the oil-collecting side of said oil-collecting means.

51. In a horizontal thrust bearing, a rotatable thrust collar, bearing members cooperating therewith, an annular member adapted to embrace the peripheral surface of said thrust collar and provide an oil passage between said collar and member, and means on said annular member for collecting oil from the oil-carrying surface of said collar and directing it into operative relation to said bearing members.

52. In a horizontal thrust bearing, a rotatable thrust collar, bearing members cooperating therewith, an annular member adapted to embrace the peripheral surface of said thrust collar and provide an oil passage between said collar and member, a plurality of chambers in which said bearing members are disposed, and means on said annular member for collecting oil from the oil-carrying surface of said collar and directing it into said chambers.

53. In a horizontal thrust bearing, a rotatable thrust collar, bearing members cooperating therewith, an annular member adapted to embrace the peripheral surface of said thrust collar and provide an oil passage between said collar and member, a chamber on each side of said thrust collar in which said bearing members are disposed, and means on said annular member for collecting oil from the oil-carrying surface of said collar and directing it into one or the other of said chambers as said thrust collar rotates in one direction or the other.

54. In a horizontal thrust bearing, a rotatable thrust collar, bearing members cooperating therewith, an annular member adapted to embrace the peripheral surface of said thrust collar and provide an oil passage between said collar and member, a plurality of oil-retaining chambers in which said bearing members are disposed, means on said annular member for collecting oil from the oil-carrying surface of said thrust collar and directing it into said oil-retaining chambers, the inlets of said chambers respectively communicating only with the portions of said oil passage on the opposite sides of said oil-collecting means, and connections between said oil-retaining chambers.

55. In a horizontal thrust bearing, a rotatable thrust collar, bearing members cooperating therewith, an annular member adapted to embrace the peripheral surface of said thrust collar and provide an oil passage between said collar and member, a plurality of oil-retaining chambers in which said bearing members are disposed, means on said annular member for collecting oil from the oil-carrying surface of said thrust collar and directing it into said oil-retaining chambers, the inlets of said chambers respectively communicating only with the portions of said oil passage at the opposite sides of said oil-collecting means, connections between said oil-retaining chambers, and means at the lower side of said oil-carrying surface for separating the two portions of said oil passage.

56. In a horizontal thrust bearing, a rotatable thrust collar, bearing members cooperating therewith, an annular member embracing the peripheral surface of said thrust collar and providing an oil passage between said collar and member, one or more oil-retaining chambers in which said bearing members are disposed, and means on said annular member for collecting oil from the oil-carrying surface of said collar and directing it into said chamber or chambers to maintain the same filled with oil.

57. In a horizontal thrust bearing, relatively rotatable bearing members, a housing for said bearing including oil-retaining chambers in which said bearing members are disposed, a rotatable oil-carrying surface, and means for collecting oil from said oil-carrying surface and directing it into said chambers, said oil-collecting means being so related to said chambers that a pressure is maintained to circulate the oil through said chambers in whichever direction said oil-carrying surface is rotating.

58. In a horizontal thrust bearing, relatively rotatable bearing members, a housing for said bearing including oil-retaining chambers in which said bearing members are disposed, a rotatable oil-carrying surface, means for collecting oil from said oil-carrying surface and directing it into said chambers, said oil-collecting means being so related to said chambers that a pressure is maintained to circulate the oil through said chambers in whichever direction said oil-carrying surface is rotating, and an oil-cooling device through which the oil is circulated by the pressure maintained on the oil.

59. In a horizontal thrust bearing, relatively rotatable bearing members, a housing for said bearing including oil-retaining chambers in which said bearing members are disposed, a rotatable oil-carrying surface, means for collecting oil from said oil-carrying surface and directing it into said chambers, said oil-collecting means being so related to said chambers that a pressure is maintained to circulate the oil through said chambers in whichever direction said oil-carrying surface is rotating, and a journal bearing through which the oil is circulated by the pressure maintained on the oil.

In testimony whereof I have signed this specification.

HARRY A. S. HOWARTH.